United States Patent
Zerby et al.

(10) Patent No.: US 12,233,380 B2
(45) Date of Patent: Feb. 25, 2025

(54) ENVIRONMENTAL CONTROL SYSTEM UTILIZING AN ANION CONDUCTING MEMBRANE

(71) Applicant: FFI IONIX IP, INC., Wilmington, DE (US)

(72) Inventors: Jacob Zerby, Dover, DE (US); Bamdad Bahar, Georgetown, DE (US); Sai Yellamilli, Milford, DE (US)

(*) Notice: Subject to any disclaimer, the term of this patent is extended or adjusted under 35 U.S.C. 154(b) by 0 days.

(21) Appl. No.: 18/520,515

(22) Filed: Nov. 27, 2023

(65) Prior Publication Data

US 2024/0165555 A1    May 23, 2024

Related U.S. Application Data

(63) Continuation of application No. 17/790,120, filed as application No. PCT/US2020/067471 on Dec. 30, 2020, now Pat. No. 11,826,698.

(60) Provisional application No. 62/974,880, filed on Dec. 30, 2019.

(51) Int. Cl.
*B01D 53/32* (2006.01)
*B01D 53/02* (2006.01)
*B01D 53/14* (2006.01)

(52) U.S. Cl.
CPC .......... *B01D 53/326* (2013.01); *B01D 53/02* (2013.01); *B01D 53/1475* (2013.01); *B01D 2257/104* (2013.01); *B01D 2257/504* (2013.01)

(58) Field of Classification Search
CPC .. B01D 53/326; B01D 53/02; B01D 53/1475; B01D 2257/104; B01D 2257/504
USPC .......................................................... 205/765
See application file for complete search history.

(56) References Cited

U.S. PATENT DOCUMENTS

| | | |
|---|---|---|
| 2009/0022038 A1 | 9/2009 | Monzyk et al. |
| 2014/0072836 A1 | 3/2014 | Mills |
| 2015/0041323 A1 | 2/2015 | Faita |
| 2018/0058729 A1 | 3/2018 | Bahar |
| 2019/0264341 A1 | 8/2019 | Bahar et al. |

OTHER PUBLICATIONS

Kaczur et al. "Carbon Dioxide and Water Electrolysis Using New Alkaline Stable Anion Membranes"; Frontiers in Chemistry, vol. 6, Article 263 (Jul. 2018).

*Primary Examiner* — Anita Nassiri-Motlagh

(57) ABSTRACT

An environmental control system employs an electrolysis cell utilizing an anion conducting membrane. A power supply is coupled across the anode and cathode of the electrolysis cell to drive reactions to reduce oxygen and/or carbon dioxide in an output gas flow. A cathode enclosure may be coupled with the electrolysis cell and provide an input gas flow and receive the output gas flow. A first electrolysis cell may be utilized to reduce the carbon dioxide concentration in an output flow that is directed to a second electrolysis cell, that reduces the concentration of oxygen. The oxygen and/or carbon dioxide may be vented from the system and used for an auxiliary purpose. An electrolyte solution may be configured in a loop from a reservoir to the anode, to provide a flow of electrolyte solution to the anode. Moisture from the cathode may be collected and provided to the anode.

20 Claims, 6 Drawing Sheets

ENVIRONMENTAL CONTROL SYSTEM UTILIZING AN ANION CONDUCTING MEMBRANE

CROSS REFERENCE TO RELATED APPLICATIONS

This application is a continuation of U.S. patent application Ser. No. 17/790,120, filed on Jun. 29, 2022 and currently pending, which is a 371 application of PCT/US2020/067471, filed on Dec. 30, 2020, which claims the benefit of priority to U.S. provisional patent application No. 62/974,880, filed on Dec. 30, 2019; the entirety of each prior application is hereby incorporated by reference herein.

GOVERNMENT LICENSE RIGHTS

This invention made with government support contract number 68HERC20C0038 awarded by United States Environmental Protection Agency. The government has certain rights in the invention.

BACKGROUND OF THE INVENTION

Field of the Invention

An electrolysis cell incorporating an anion conducting membrane is configured in a system to control concentrations of gases on either the anode side and/or cathode side of the electrolysis cell.

Background

There are many types of enclosures that require environment control wherein the oxygen and/or the humidity level is controlled. For example, museum artifacts and documents are often stored in environmentally controlled enclosures to reduce degradation due to oxidation, rust and the like. In addition, produce and other consumer products and goods may benefit from storage in environment-controlled enclosures, including refrigerated items.

Electrolysis of water can be used to move water and oxygen between two chambers, allowing for oxygen generation or depletion and humidification or dehumidification. Electrolysis can also be used to transport molecules like carbon dioxide.

Current state of the art electrolysis cells based on proton exchange membranes (PEM) require more expensive catalysts, typically in the Pt family, and Titanium and noble metal coated components, which adds additional cost to the system. A lower cost system would allow the integration of these items into a wide variety of applications.

A lower cost system employing anion conducting membranes allows for lower grade catalysts and less expensive metal components to carry out electrolysis.

SUMMARY OF THE INVENTION

The invention is directed to an environmental control system employing an electrolysis cell utilizing an anion conducting membrane. The following reactions describe the operation of the system when used for hydrogen generation with an electrolyte:

Cathode: $4H_2O + 4e^- \rightarrow 2H_2 + 4OH^-$

Anode: $4OH^- \rightarrow 2H_2O + O_2 + 4e^-$

When used in air as a climate control system, the system operates under different governing half reactions. An anion conducting electrolysis call can operate under the following half reactions to effectively move water and oxygen between two environments:

Cathode: $2H_2O + O_2 + 4e^- \rightarrow 4OH^-$

Anode: $4OH^- \rightarrow 2H_2O + O_2 + 4e^-$

Water and oxygen are broken up at the cathode to produce hydroxyl ions. The hydroxyl ions travel through the membrane and recombine at the anode to produce water and oxygen. The water and oxygen are effectively moved from one environment to another.

When carbon dioxide is present there are a set of competing reactions, wherein carbon dioxide reacts with hydroxyl ions to form bicarbonate. The bicarbonate can also react further to form carbonate ions. All ions are competing for transport through the membrane, and the applied potential and cell conditions determine the quantity of each species. Below are the reactions at the cathode side with the generated hydroxyl ions when carbon dioxide is present:

$OH^- + CO_2 \rightarrow HCO_3^-$ $OH^- + HCO_3^- \rightarrow CO_3^{2-}$

In an exemplary embodiment, the cell assembly is a multi-layer structure. The membrane has a catalyst layer on either side, sandwiched between gas diffusion layers. The catalyst may be from the Pt group, or more preferably a lower cost catalyst comprising, nickel, silver, copper, manganese, iron, or other lower cost catalyst. The gas diffusion layer is typically composed of Ni, SS, Ti, or carbon substrates.

An exemplary anion conducting polymer comprises quaternary ammonium or phosphonium functional groups, with poly(styrene), poly(phenylene), polybenzimidazole or poly(arylene) backbones. Rigid, aromatic polymer backbones such as poly(phenylene) or poly(arylene) provide high tensile strength along with resistance to chemical degradation via hydroxide elimination reactions in a highly caustic environment. Ion exchange membranes produced with these ionomers can further be reinforced by porous support materials, such as microporous polytetrafluoroethylene, polyethylene, polyvinylidene fluoride, polyether ether ketone or polypropylene membranes. Reinforcing the ionomer with the porous support matrix, creates a composite anion conducting membrane. The preferred microporous support for use in the present invention is porous ultra-high molecular weight polyethylene, as it has superior chemical compatibility, compared to expanded polytetrafluoroethylene, the standard for reinforced cation exchange membranes and porosity, compared to polypropylene, an alternative polyolefin support. An exemplary ion exchange membrane for use in the present invention comprises a polymer with a poly(arylene) or poly(phenylene) backbone and alkyl or piperidine side chains featuring quaternary ammonium or phosphonium groups for ionic conductivity. In an exemplary embodiment, a solution of this ionomer is impregnated into a microporous polyolefin support for greater reinforcement and stability, especially at lower thickness.

An exemplary anion conducting membrane is a composite anion conducting membrane comprising an anion conducting polymer that is reinforced by a support material. An exemplary composite anion conducting membrane incorporates a microporous polyolefin that is coated or impregnating with an anion conducting polymer. An exemplary support material, such as a microporous polyolefin support material, has a thickness of about 5 and 100 microns, a porosity ranging from approximately 50% to 90% and a pore size between approximately 20 nm and 5 microns, or more preferably between 20 nm and 1 micron. An exemplary anion conducting polymer solution comprises a precursor form of the ionomer comprising tertiary amine groups grafted to a poly(arylene) or poly(phenylene) backbone, along with a crosslinking agent such as divalent metal cations, tetramethyl-1,6-hexanediamine, or 4,4'-trimethylenebis(1-methyl-piperidine), and then exposing the dried composite membrane to trimethylamine solution in water or ethanol. The crosslinking can be initiated or accelerated by exposure to high temperatures as well as infrared or ultraviolet radiation.

An exemplary support material may be porous, or microporous polyolefin, such as a porous polyethylene, polypropylene or polyester, for example. An exemplary support material may be a porous polymer and may include a porous fluoropolymer, such as an expanded fluoropolymer, including expanded polytetrafluoroethylene.

An exemplary anion conducting membrane or composite anion conducting membrane has a thickness of no more than about 100 microns, no more than about 75 microns, no more than 50 microns, no more than about 40 microns, no more than about 30 microns, no more than about 20 microns, or from about 20 microns to about 50 microns, and any other range between and including the thickness values provided.

An exemplary anion conducting membrane is an anisotropic anion conducting membrane, that has varying properties through the thickness of the layer and may comprise a series of thin films fused together to create an anisotropic membrane. Typically, quaternary ammonium ions are the cationic site and the backbone is varied, however it is possible to create cationic species with phosphonium as the cationic center. The number of layers can be altered as well as step changes in the blend ratio to generate membranes of significantly anisotropic internal structures.

The anion conducting polymer within an anion conducting membrane may be crosslinked using a crosslinking agent or compound. Anion conducting polymers, such as within a composite anion conducting membrane, may be crosslinked to increase their mechanical and chemical stability, especially in hydrated conditions. In the case of an anionic ionomer with functional quaternary ammonium groups, crosslinks may be made between polymer chains by linking quaternary ammonium groups together with crosslinking agents such as polyamines, blocked polyamines, dicyanodiamides, divalent metal cations, tetramethyl-1,6-hexanediamine, 4,4'-trimethylenebis(1-methyl-piperidine), or 4,4'-(1, 3-Propanediyl)bis(1-methyl-piperidine). A composite anion conducting membrane may be formed by imbibing a support material with a polymer solution containing the ionomer along with one of the above crosslinking agents at a prescribed molar ratio of crosslinking agent to functional ionic groups. These membranes are characterized by nano-scale channels that essentially hold water and conduct anions, such as hydroxyl ions. These new anion conducting membranes have demonstrated the ability to achieve high conductivity for anions or high permselectivity.

In an exemplary embodiment, an environment control system is coupled with an enclosure and comprises an oxygen depletion electrolyzer cell that reduces the oxygen concentration in an enclosure. An oxygen depletion electrolyzer cell comprises an ion conducting material, such as an ionomer that transports anions, or hydroxyl ions, from a cathode to an anode, wherein the anode and cathode are configured on opposing sides of the ionomer. The cathode is in fluid communication with the enclosure and a power source is coupled with the anode and cathode to provide an electrical potential across the anode and the cathode to initiate electrolysis of water. Water and oxygen are consumed at the cathode to produce hydroxyl ions. The hydroxyl ions are transported across the ionomer, or anion conducting material, to the anode, where these hydroxyl ions are oxidized to form water and oxygen, thereby depleting oxygen and water on the cathode side and generating water and oxygen on the anode side. The cathode may be either in direct contact with the air in the enclosure, or the air may be plumbed to the cathode. An air moving device may be configured in either setup.

An exemplary environment control system may comprise an oxygen generation electrolyzer cell, wherein the anode is configured in fluid communication with the enclosure and produces oxygen from the reaction of water and oxygen at the cathode. An oxygen control electrolyzer cell may be run in either an oxygen depletion mode or an oxygen generation mode, depending on the potential applied across the anode and the cathode. The anode may be either in direct contact with the air in the enclosure, or the air may be plumbed to the anode. An air moving device may be configured in either setup.

An exemplary environment control system comprises a humidity control device, such as a humidification device that increases the humidification level of the enclosure. The anode is configured in fluid communication with the enclosure and produces water from the reaction of water and oxygen at the cathode. The anode may be either in direct contact with the air in the enclosure, or the air may be plumbed to the anode. An air moving device may be configured in either setup.

An exemplary environmental control system comprises a dehumidification electrolyzer cell, wherein the electrolyzer cell is run with the cathode in fluid communication with the enclosure. The cathode may be either in direct contact with the air in the enclosure, or the air may be plumbed to the cathode. An air moving device may be configured in either setup.

An exemplary environmental control system comprises a carbon dioxide removal cell, wherein the electrolyzer cell is run with the cathode in fluid communication with the enclosure. The cathode may be either in direct contact with the air in the enclosure, or the air may be plumbed to the cathode. An air moving device may be configured in either setup.

An exemplary environmental control system comprises a carbon dioxide generation cell, wherein the electrolyzer cell is run with the anode in fluid communication with the enclosure. Carbon dioxide is removed from the anode loop and fed to the enclosure. The cathode may be either in direct contact with the air in the external environment, or the air may be plumbed to the cathode. An air moving device may be configured in either setup.

An exemplary embodiment, wherein the voltage is increased to generate ozone for disinfection.

In an exemplary embodiment, the oxygen control and/or the humidification electrolyzer, comprises an anion conducting ionomer that is in the form of a anion conducting membrane, or thin sheet or layer. The anion conducting membrane may be formed into a composite anion conducting membrane comprising a support material that is coated and/or imbibed with the ionomer. The anion conducting membrane may be very thin, such as less than 100 microns, less than 75 microns, less than 50 microns, less than 25 microns, less than 20 microns and more preferably less than 15 microns. A thin anion conducting membrane is preferred for oxygen depletion as it will allow for higher rates of proton transport and better efficiency. Thicker anion conducting membranes are more effective for humidity control devices, as back diffusion is limited.

In an exemplary embodiment, an additive is added to the membrane to improve moisture retention properties. This additive may be a desiccant, and not limited to ionic liquid desiccants or solid desiccants such as anhydrous silica.

An exemplary environment control system may include control system to monitor the humidity or oxygen level within the control chamber, and then control the voltage potential across the anode and cathode of the dehumidification electrolyzer cell of the humidity control chamber.

Any number of filters and/or valves may be used to control gas or air flow into or around the environment control system. Filters may be configured to the conditioner chamber to prevent contaminates from poisoning the electrolyzer cells. Filters may be configured on inlet and outlets to the enclosure.

In one embodiment, an air moving device is configured to blow across or onto an electrode of an electrolyzer. It has been found that this greatly increase the performance of the electrolyzer. This may be onto the cathode, anode, or both.

To prevent drying of the membrane and loss of conductivity a water or electrolyte loop on the anode side may flow water or an electrolyte solution to the anode catalyst layer. The electrolyte loop may be configured with various configurations of pumps, fittings and valves.

In an exemplary embodiment, an electrolyte solution containing water, a hydroxide solution, a carbonate solution, or combination thereof may be employed at the anode of the cell.

In an exemplary embodiment, a carbonate is the preferred electrolyte for oxygen and water transport, as this mitigates the issue of carbon dioxide poisoning from exposure of the membrane to air. When using a hydroxide solution, carbon dioxide solubilizes in water and enters the membrane, which inhibits hydroxyl ion flow and reduces performance of the system. Having the mobile species be carbonate alleviates this issue and the air inerting system based on anion conducting electrolysis cell will not see a decrease in performance.

In an exemplary embodiment, a method of capturing, reducing, removing water, or a combination thereof, is employed to reduce the humidity in the cathode side caused by diffusion of water from the electrolyte at the anode of the cell. This may be carried out by employing a water recapture device such as a chiller to condense the water vapor out of the air. This condensed air may then be added back to the electrolyte loop to reclaim the water. In certain embodiments a dehumidifier may be used, and the water discarded from the system. In other embodiments, the electrode layers may be modified to improve the hydrophobicity by adding a hydrophobic additive such as PTFE. This will reduce the amount of water that exits the electrode layer and enters the cathode air. The membrane may also be modified at the surface of the cathode by adding a thin layer of membrane material that has greater hydrophobicity than the bulk membrane layer.

In an exemplary embodiment, a pump is used to circulate the electrolyte or electrolyte solution on the anode of the cell. There may be a water make-up system to supply additional water for any water lost in the electrolyte loop.

In an exemplary embodiment, the system is designed to function without a pump, wherein the gas evolution at the electrode drives electrolyte circulation. This reduces system complexity and cost. There may be a feed line to make up for any water lost in the electrolyte loop.

In an exemplary embodiment, an oxygen removal system is hooked up to the electrolyte recirculation line or tank. The oxygen removal system allows for excess oxygen to leave the closed loop system so there is no pressure build-up, while also stopping any electrolyte solution from leaving the system. It may comprise a pressure relief valve, a check valve, a filter, a water trap, or any combination of valves to allow oxygen to escape while leaving behind water and the electrolyte.

In an exemplary embodiment, heat is added to the system to improve the kinetics of the reaction and improve oxygen and/or carbon dioxide removal. The heat may be applied directly to the cell, to the reservoir, to the electrolyte line, or combination thereof. In an exemplary embodiment, a carbon dioxide removal system is places before the oxygen removal cell. The carbon dioxide removal system may be one of the following, but is not limited to, pressure swing, temperature swing, membrane separation, or electrolysis. Removing the carbon dioxide before the oxygen removal cell reduces any chance of poisoning the membrane of the oxygen removal cell.

In an exemplary embodiment, an electrochemical carbon dioxide removal cell is placed in series with the oxygen removal cell. Carbon dioxide reacts at the cathode of the carbon dioxide removal cell and feeds a stream containing low levels of carbon dioxide to the oxygen removal cell. The carbon dioxide removal cell operates at lower current densities because of the transport of the bulkier carbonate and bicarbonate groups. The cell is sized to reduce the carbon dioxide level to an acceptable level as to not impede the performance of the oxygen removal cell.

In an exemplary embodiment, an electrochemical carbon dioxide removal cell is placed in series with the oxygen removal cell. There are some instances where it may be beneficial to have low oxygen levels but maintain the carbon dioxide level. The anode side of the carbon dioxide cell may have a gas separation system that feeds the carbon dioxide back into the enclosure. In this way the enclosure now has low levels of oxygen, but maintained the carbon dioxide level.

There are many different applications wherein the control of oxygen concentration and/or relative humidity levels are required or desired. Many enclosures are configured to control these environmental parameters including, but not limited to, safes or enclosures for valuable items that may be damaged by prolonged exposure to high humidity, such as documents, artifacts, jewels, jewelry, weapons, guns, knives, currency and the like. In addition, there are applications where a flow of air having a controlled level of oxygen and/or humidity are desired, such as a Positive Airway Pressure (PAP) device, a respirator, an oxygen respirator and the like. A PAP device provides a pressurized flow of air to a person to aid in effective breathing while sleeping. An environment control system, as described herein, may provide additional humidity and/or oxygen to the flow of air in a PAP device. In addition, there are articles, such as produce, that may be located in an enclosure wherein the control of oxygen level is desired or beneficial. A reduced oxygen level in a refrigerator compartment for produce may prevent the produce from spoiling or going bad. In addition, some enclosures may have a controlled and reduced level of oxygen to kill organisms.

Oxygen reduction is very desirable to prevent oxidation, to kill germs and bug infestations, preserve food, valuable artifacts and to prevent a fire from originating inside the enclosure. Separately, controlling the humidity is just as important. There are disadvantages to running an electrolyzer cell without independent control of the humidity and oxygen levels. One is the lack of precise independent control over either of the conditions. The ideal humidity and oxygen levels vary depending on what is being preserved inside the enclosure. One way to achieve precise control is to remove moisture separately with another form of dehumidification or to use an electrolyzer cell in reverse while sealing it off from the enclosure. The seal could consist of a window with a membrane that allows moisture to pass through but not gases, including oxygen. This type of independent control of humidity and oxygen removal requires a way to measure the contents of the enclosure. You also need to be able to independently control the humidifying and dehumidifying system with electronics. The integrity of the seal and the conditions outside the enclosure play a role in the efficiency.

An enclosure and in particular a cathode enclosure, as described herein, is any enclosure coupled with the anion conducting electrolysis cell and wherein the concentration of gases within the enclosure are controlled or modified by the anion conducting electrolysis cell. An exemplary enclosure may be configured for access and have a door for retrieval of items contained therein. An exemplary cathode enclosure includes, but is not limited to, tubes or conduits for gases, humidors, refrigerator or freezer sub-compartments, museum displays, gun storage, musical instrument storage, paper storage, and storage of a host of moisture sensitive products such as fossils, ancient artifacts, stamps, bonds, etc. as well as shipping containers. An exemplary control system may be sized to meet the demands of the enclosure. A larger enclosure will require a larger oxygen depletion electrolyzer cell area than a smaller enclosure.

There is recognition that in some cases reactant gases must be inside the enclosure. The enclosure may not always be in a hermetically sealed system, i.e. some leakage in and out of the enclosure is an option. In addition, the system can be controlled with a sensor inside the device, in others the system is simply switched on and off for a limited duration.

In certain embodiments, the gas fed to the inlet of the cathode of the electrolysis is from ambient air and is not contained in an enclosure. This may be beneficial for generation and use of CO2 and oxygen, rather than inerting.

An exemplary environment control system, may comprise a remote monitor for an enclosure, and may comprise wireless monitoring of the enclosure conditions including humidity level and oxygen concentration or level. The enclosure environmental conditions may be sent to a remote electronic device, such as a mobile telephone, tablet computer or computer. A user may change the desired set points of humidity, temperature and oxygen level of the enclosure. Wireless transmission may also allow a remote electronic device to record the enclosure parameters, temperature, humidity and oxygen level. In addition, a user may receive an alert if there are significant changes in the enclosure environment parameters or if one of the parameters fall moves outside of a threshold value for one of the set points.

An exemplary control system comprises an oxygen and humidity control system that can be used in combination with other systems. For example, it has been found that using Spanish cedar with a humidity control device provides humidity buffering. Also, it has been found that using a silica gel in combination with a humidity control device also provides humidity buffering; and there are some advantages because if electricity is switched off, or if for some reason the system under or over humidifies, the buffer can compensate. A silica gel or other hygroscopic material may be placed within an enclosure to provide this moisture buffering. Some hygroscopic materials have a humidity level range wherein the absorb or release moisture when the relative humidity goes above the range or drops below the range, respectively.

Definitions

Inerting, as used herein, refers to controlling the gas concentrations within an enclosure and particularly increasing the concentration of inert gases in the enclosure, such as by removal or reactive gases such as oxygen.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
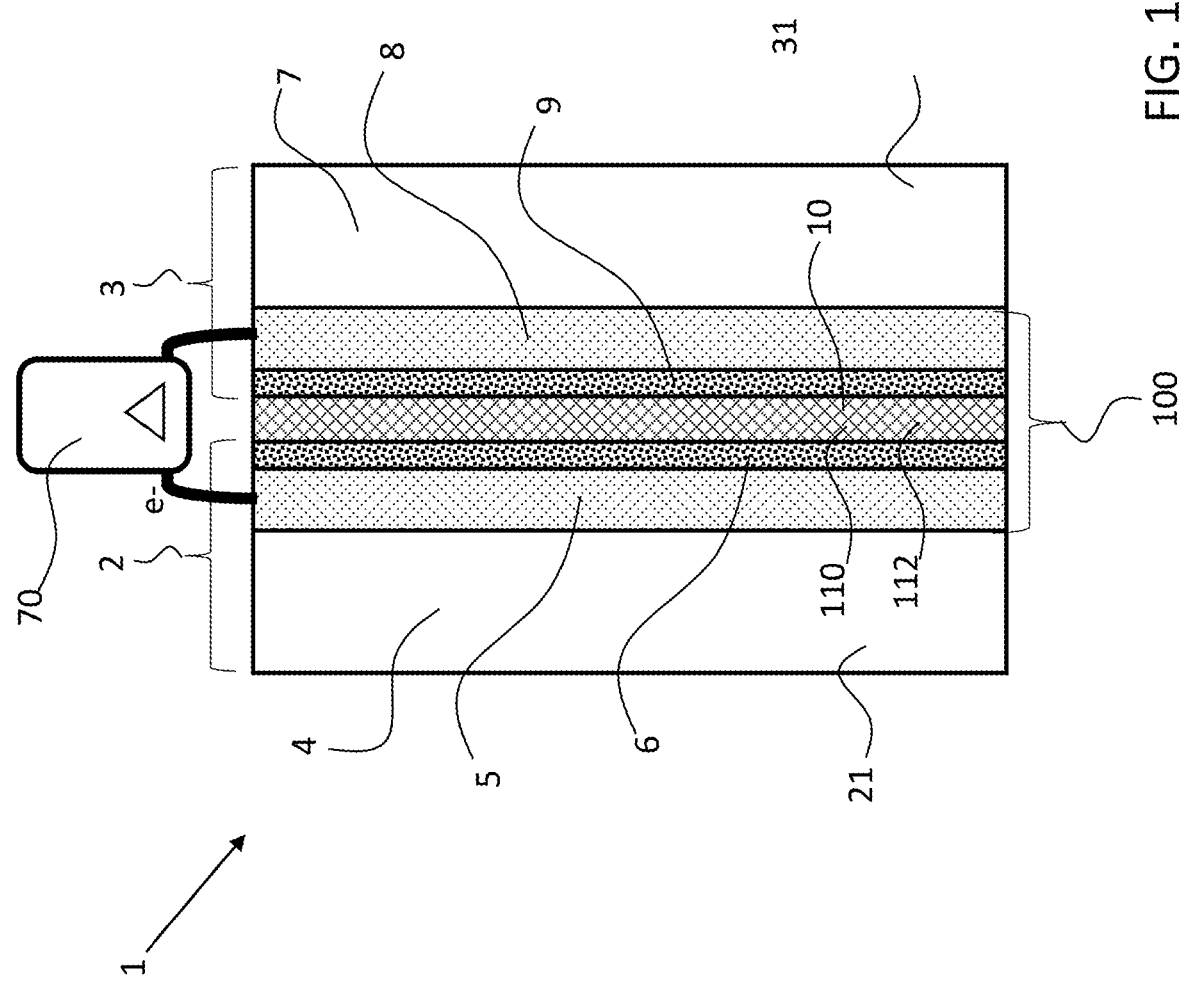
FIG. 1 shows an exemplary electrolysis cell diagram for an inerting system.

Referring to FIG. 1, an electrolysis cell 1 has a cathode 2 on the cathode side 21 and an anode 3 on the anode side 31. The anode and cathode are configured on opposing sides of an anion conducting membrane 10. The cathode is made up of a cathode chamber 4, a cathode gas diffusion layer 5, and a cathode catalyst layer 6. The anode comprises an anode chamber 7, an anode porous current collector 8, and an anode catalyst layer 9. The anion conducting membrane assembly 100 includes the anode catalyst layer, anion conducting membrane and the cathode catalyst layer, and may also include the cathode gas diffusion layer and the anode porous current collector. The anion conducting membrane 10 may be a composite anion conducting membrane and may include a support material 112, such as a support layer or membrane, and an anion conducting polymer 110. A composite anion conducting membrane may be more durable and robust and enable the anion conducting membrane to be made thinner. As shown in FIG. 1, a power supply 70 is coupled across the anode and cathode to produce a potential across the anode and cathode for driving electrolysis. It is to be understood that a power supply is required for the system but is not shown in subsequent figures for clarity.

Figure 2:
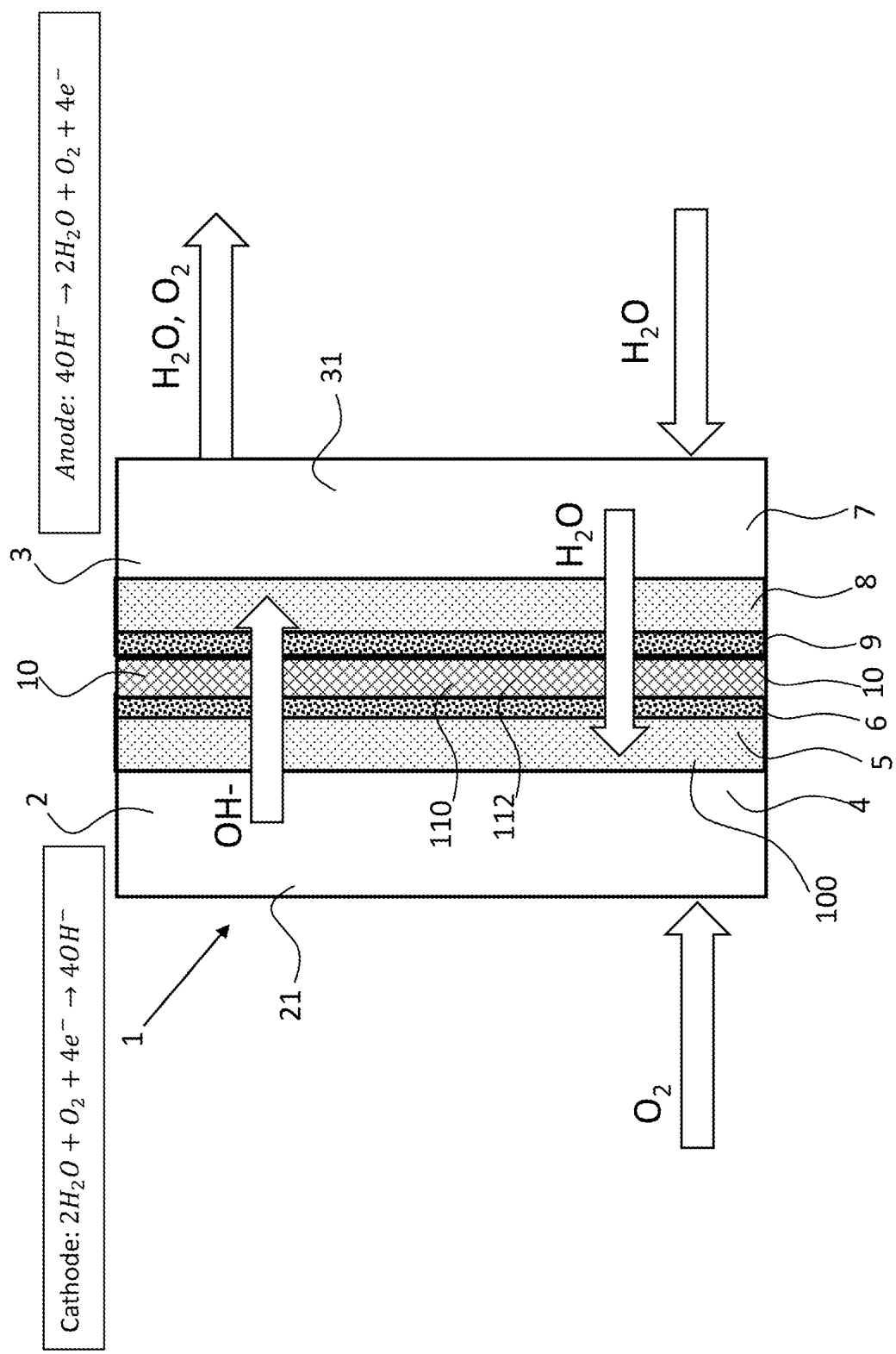
FIG. 2 shows an exemplary electrolysis cell diagram showing the operating principle of the inerting system.

Referring to FIG. 2, an electrolysis cell 1 has a cathode 2 and anode 3 configured on opposing sides of an anion conducting membrane 10. Water enters the anode of the system and is transferred across the anion conducting membrane to the cathode where it reacts with oxygen at the cathode side to form hydroxyl ions, as shown in the equation on the cathode side ($2H_2O+O_2+4e^+4OH^-$). The hydroxyl ions are transported to the anode of the electrolysis cell and react to form water and oxygen as shown in the equation on the anode side of the electrolysis cell ($4OH^-\rightarrow 2H_2O+O_2+4e^-$). In this electrolysis cell oxygen is being reduced via reaction on the cathode side of the electrolysis cell. The cathode is made up of a cathode chamber 4, a cathode gas diffusion layer 5, and a cathode catalyst layer 6. The anode comprises an anode chamber 7, an anode porous current collector 8, and an anode catalyst layer 9.

Figure 3:
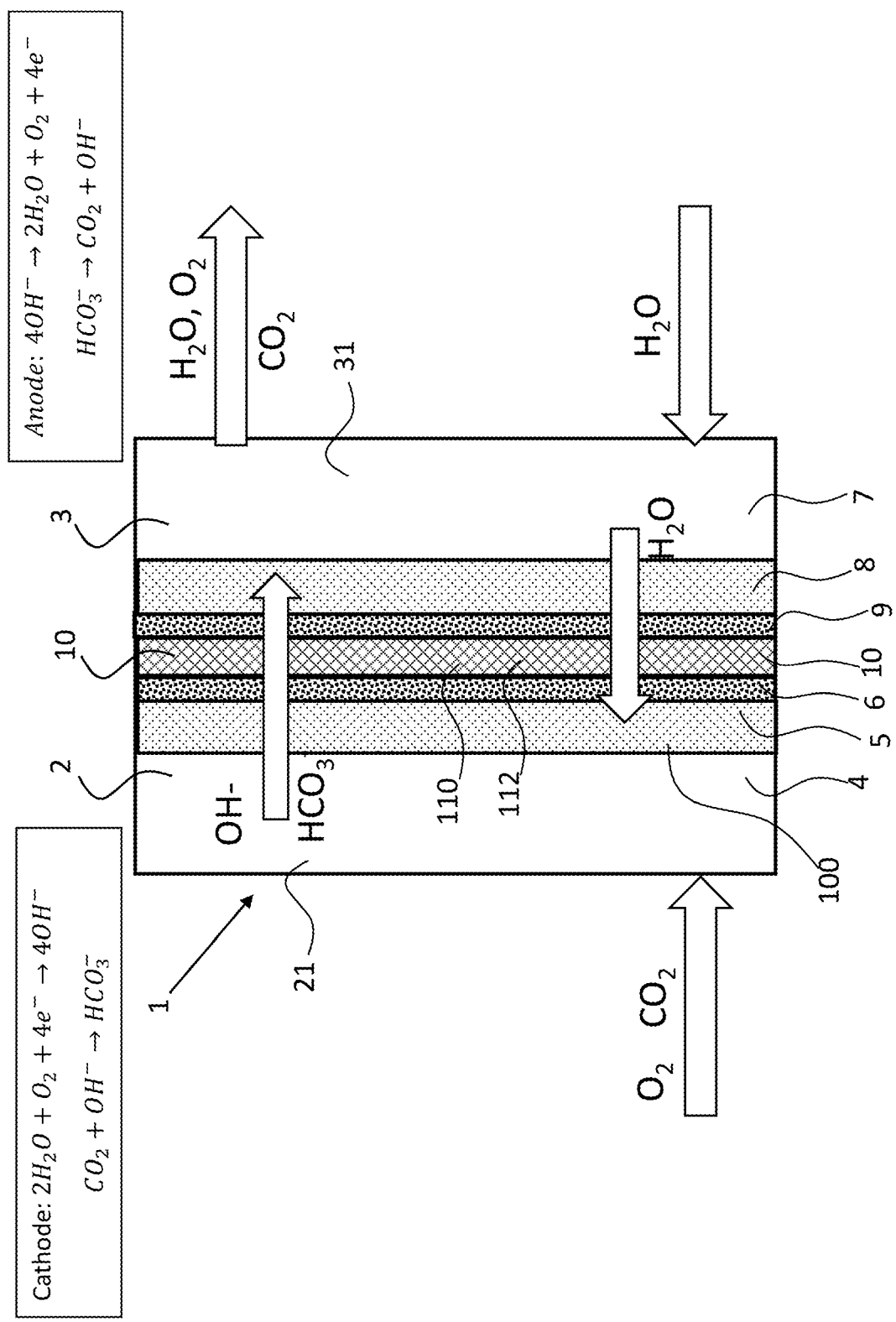
FIG. 3 shows an exemplary electrolysis cell diagram showing the operating principle of the carbon dioxide removal system.

Referring to FIG. 3, an electrolysis cell 1 has a cathode 2 on the cathode side 21 and an anode 3 on the anode side 31. The anode and cathode are configured on opposing sides of an anion conducting membrane 10. Water enters the anode of the system and is transferred across the anion conducting membrane to the cathode, and reacts with oxygen at the cathode side to form hydroxyl ions, as shown in the equation on the cathode side ($2H_2O+O_2+4e^{31}\rightarrow 4OH^-$). The hydroxyl ions react with carbon dioxide to form bicarbonate and carbonate. The hydroxyl ions, carbonate and bicarbonate transport to the anode of the electrolysis cell and react to form water, carbon dioxide, and oxygen. In this electrolysis cell carbon dioxide is being reduced via reaction on the cathode side of the electrolysis cell.

Also shown in FIG. 3, is an equilibrium reaction that occurs on the cathode side of the electrolysis cell, wherein carbon dioxide and hydroxyl groups react to form bicarbonate, ($CO_2+OH^+\rightarrow HCO_3^-$). The bicarbonate ion is transferred across the anion conducting membrane to the anode side where it reforms carbon dioxide and hydroxyl groups ($HCO_3^{31\rightarrow CO}{}_2+OH^-$).

Figure 4:
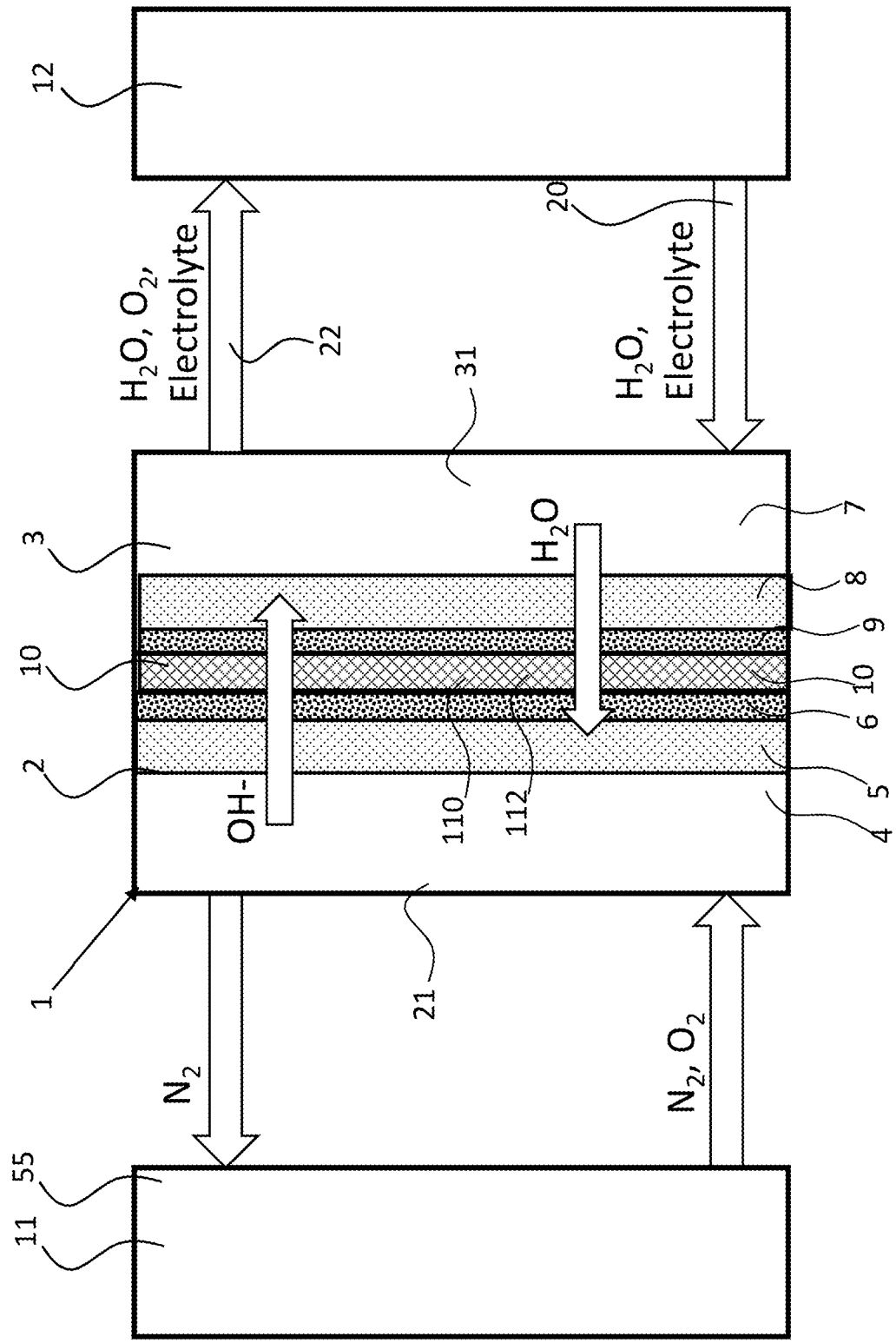
FIG. 4 shows an exemplary electrolysis cell diagram including an inerting system cathode connected to an enclosure, with an electrolyte loop circulating at the anode.

Referring to FIG. 4, water and an electrolyte, an electrolyte solution 20, flow in an electrolyte loop 22 from an electrolyte solution reservoir 12 to the anode side 31 of the electrolysis cell 1 and back to the electrolyte solution tank. The electrolyte solution reservoir may be a closed loop for a period of time and may receive additional electrolyte solution periodically as required. On the cathode side, oxygen is removed from the cathode enclosure gas 55, that flows from the cathode enclosure 11 to the cathode. The reaction on the cathode side of the electrolysis cell is $2H_2O+O_2+4e^-\rightarrow 4OH^-$, thereby forming a higher concentration of nitrogen in the cathode enclosure 11. Note, that the electrolysis cell 1 may be operated without a cathode enclosure and the cathode may receive a cathode inlet gas flow from the environment.

Figure 5:
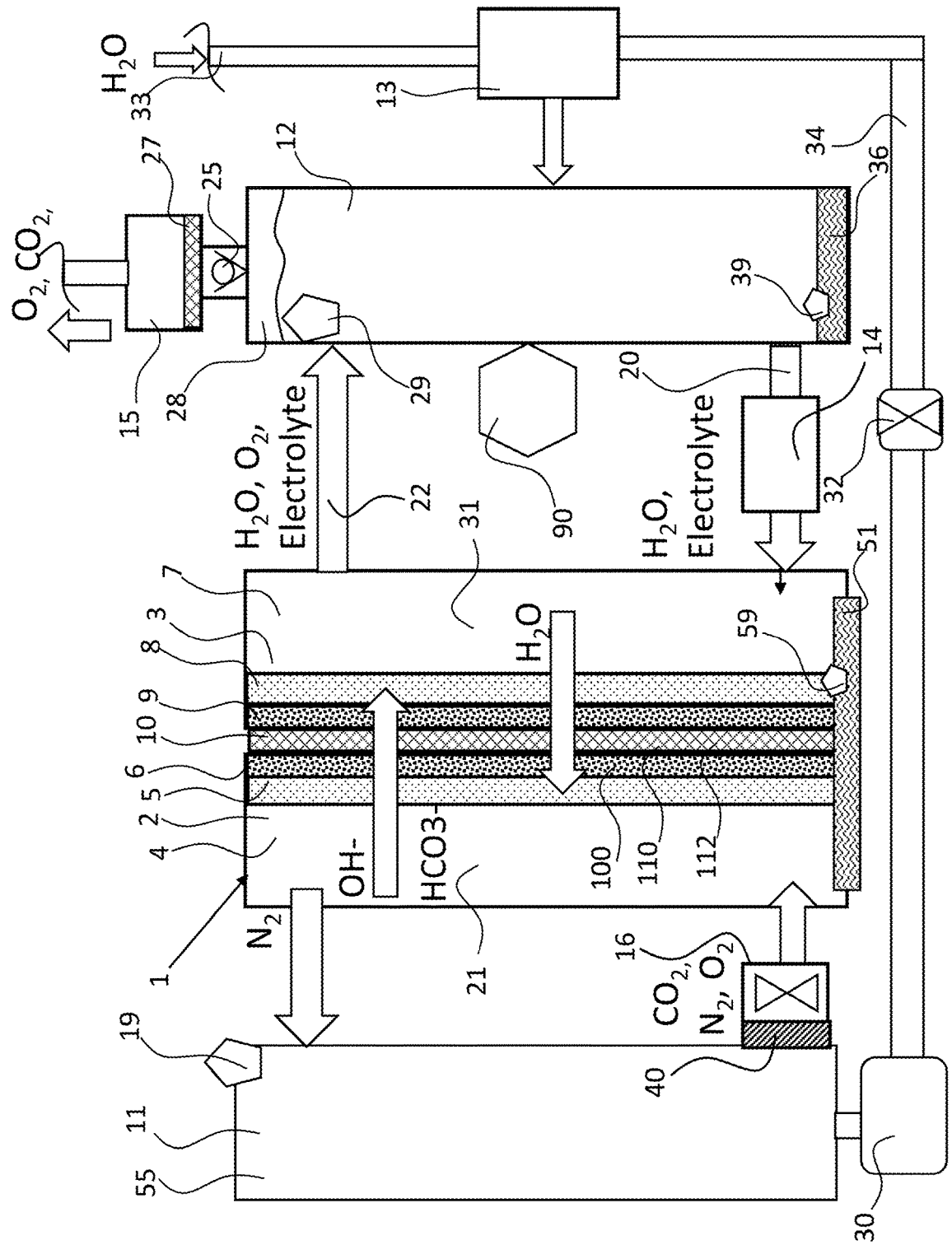
FIG. 5 shows an exemplary electrolysis cell diagram including the inerting system cathode connected to an enclosure, with an electrolyte loop circulating at the anode, and a water make-up source.

Referring to FIG. 5, a water make-up system 13 is attached to the electrolyte loop. The water make-up system adds water to the electrolyte loop 22 as water is transferred across the anion conducting membrane 10 to the cathode. The water make-up system maintains the pH of the electrolyte solution 20 in the electrolyte loop 22. The flow of electrolyte solution in the electrolyte loop may be controlled by the exit flow from the anode, as indicated by the bold arrow exiting the anode. The water make-up system may receive water from a water source 33, or may receive water that has been collected by a water reclamation device 30, such as a condenser. The water collected by the water reclamation device may be pumped by a pump 32 to the water make-up system 13 or electrolyte solution loop 22 through a conduit 34. Note that the water or moisture collected by water reclamation device may flow be gravity from the cathode side 21 to the water make-up system 13 coupled to the anode side 31.

Also shown in FIG. 5, is an optional electrolyte pump 14 that is connected to the electrolyte loop 22 to force flow of the electrolyte solution 20 to the anode chamber. An optional oxygen removal system 15 is connected to the electrolyte loop to remove additional oxygen from the closed loop. An exemplary oxygen removal system may allow the release of oxygen from the anode side of the electrolysis cell, such as through venting. An exemplary oxygen removal system may draw oxygen from the head space 28 in the electrolyte solution reservoir 12 and/or may employ a check valve 25 and/or a selectively permeable membrane 27. An exemplary check valve may be a flap or a pressure controlled device that may open periodically or on a controlled schedule. An electrolyte solution sensor 29 may be configured to determine when additional electrolyte or water is required to replenish the system.

An exemplary electrolyte solution sensor may be a level sensor that detects when the electrolyte solution level drops below a certain level, or may be a pH sensor that measures the pH of the electrolyte solution and initiates replenishment when the pH exceeds a threshold level.

Carbon dioxide on the anode side may also be released from the anode side of the electrolysis cell, such as through venting from the head space. An exemplary carbon dioxide removal system may draw carbon dioxide from the head space 28 in the electrolyte solution reservoir 12 and/or may employ a check valve 25 and/or a selectively permeable membrane 27. An exemplary check valve may be a flap or a pressure controlled device that may open periodically or on a controlled schedule.

An electrolyte solution sensor heater 36 may be configured to heat the electrolyte solution 20 and an electrolyte solution temperature sensor 39 may monitor the electrolyte solution temperature and initiate heating through the controller 90, when the electrolyte solution temperature drops below a threshold level. An increased temperature of the electrolyte solution will increase the reaction rate as it improves the kinetics of reaction.

Also shown in FIG. 5, is an optional an air moving device 16 that is connected to the cathode feed side from the enclosure to improve oxygen flow to the cathode. An air moving device may be a fan, pump or other suitable device.

As shown in FIG. 5, an optional electrolysis cell heater 51 is configured to heat at least a portion of the cell, such as the anode, or the anode side of the anion conducting membrane assembly 100. An electrolysis cell temperature sensor 59 may monitor the electrolysis cell temperature and initiate heating through the controller 90, when the electrolysis cell temperature drops below a threshold level. An increased temperature of the electrolyte cell, and particularly the anode or the anode cathode layer will increase the reaction rate as it improves the kinetics of reaction.

A scrubber 40 may be configured between the cathode enclosure 11 and the cathode 2 to reduce and/or remove one or more of the components of the enclosure gas 55, such as carbon dioxide. A scrubber, such as a carbon dioxide scrubber, may be a piece of equipment that absorbs carbon dioxide ($CO_2$). An exemplary carbon dioxide scrubber may comprise an amine scrubber that utilizes an amine to react with the carbon dioxide, a mineral scrubber that may utilize a mineral or zeolite to react with the carbon dioxide, a sodium hydroxide scrubber that utilizes sodium hydroxide to react with carbon dioxide, a lithium hydroxide that utilizes lithium hydroxide to react with carbon dioxide, an absorptive scrubber that uses an absorber, such as activated carbon or metal-organic frameworks (MOFs) to absorb the carbon dioxide.

An oxygen sensor 19 may be configured to monitor the oxygen level of the cathode side 21 and/or the cathode enclosure 11. The controller 90 may change the power provided to the electrolysis cell 1 when the oxygen level exceeds a threshold value.

A controller 90, may interface with the various components of the anion electrolysis cell 1 and may control when the components are turned on or activated as a function of sensor input. A cathode enclosure sensor 19 may monitor the concentration of gases within the cathode enclosure, such as oxygen, nitrogen and/or carbon dioxide and may provide input to the controller 90. The controller may change the potential between the anode and cathode or electrical current thereto to maintain a gas level within a desired gas concentration threshold.

Figure 6:
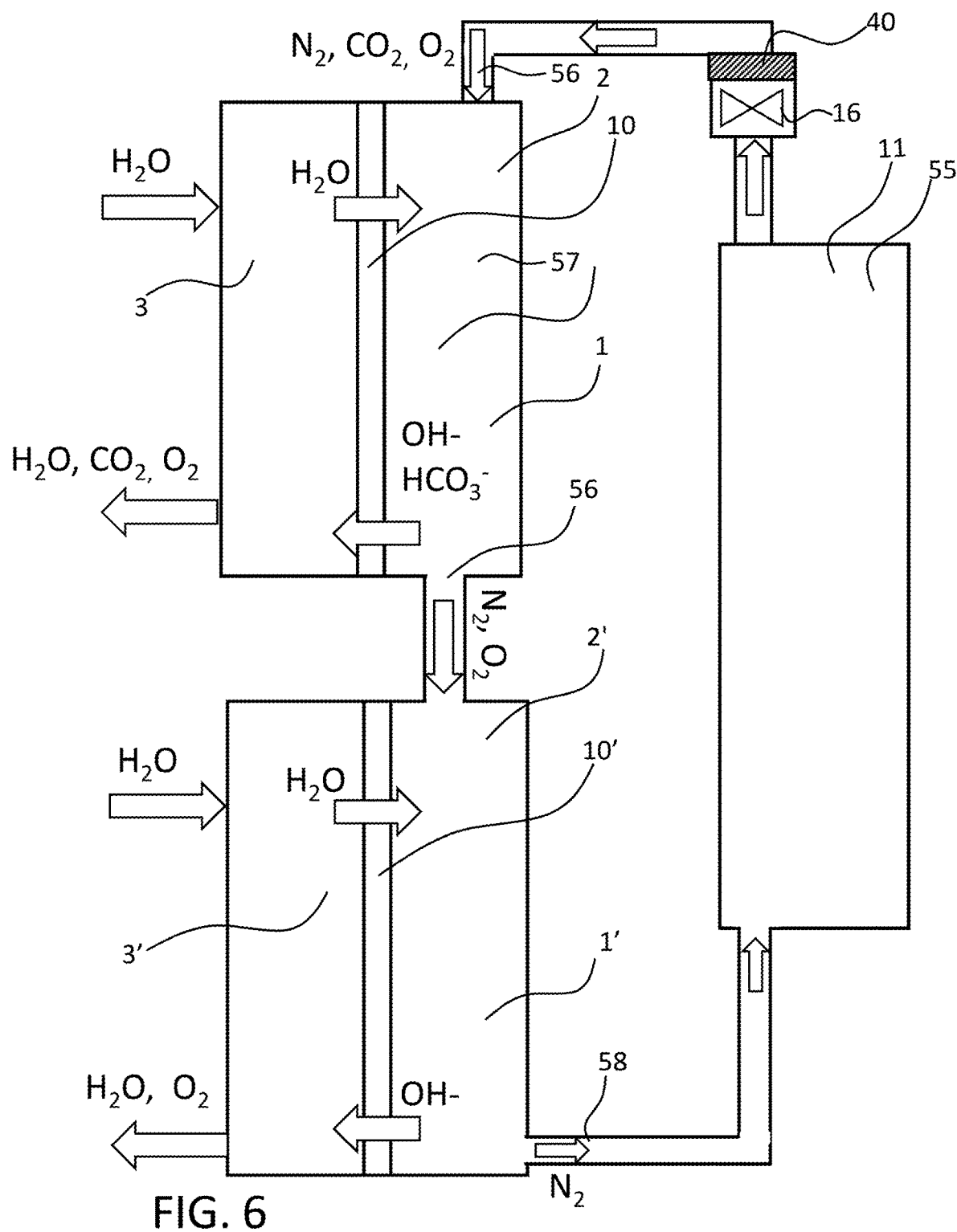
FIG. 6 shows an exemplary electrolysis cell diagram with a carbon dioxide removal cell in series with an oxygen removal cell.

Referring to FIG. 6, a first electrolysis cell 1 is in series with a second electrolysis cell 1'. The second electrolysis cell 1' has a cathode 2' and anode 3' configured on opposing sides of an anion conducting membrane 10'. The cathode enclosure contains a cathode enclosure gas 55. The first electrolysis cell is carbon dioxide removal cell that receives an inlet gas 56 from the cathode enclosure 11 and removes carbon dioxide via reaction on the cathode to produce a reduce carbon dioxide gas 57. The reduce carbon dioxide gas is then fed to the second electrolysis cell 1', an oxygen depletion cell, that produces an outlet gas 58 having a reduced oxygen concentration, wherein the reduce carbon dioxide gas is reacted on the cathode of the oxygen depletion cell to reduce an oxygen concentration from that of the reduce carbon dioxide gas. The outlet gas is then fed back to the cathode enclosure. Also, carbon dioxide from the carbon dioxide removal cell may be fed from the anode back to the enclosure, effectively maintaining the carbon dioxide levels in the enclosure while reducing the oxygen levels.

In an alternative embodiment, the inlet gas to the carbon dioxide reducing cell is from an ambient environment, or another enclosure wherein the inlet gas may be pre-treated or conditioned, such as by scrubbing to protect the catalyst of the catalyst layers. The outlet form the second electrolysis cell, the oxygen depletion cell, may flow to the cathode enclosure and the cathode enclosure may have a release vent, to enable a flow of conditioned and environmentally controlled gas to flow therethrough.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An environmental control system comprising:
    a cathode enclosure containing a cathode enclosure gas;
    a carbon dioxide removal electrolysis cell comprising:
        a) an anion conducting membrane;
        b) an anode configured on an anode side of the carbon dioxide removal electrolysis cell and comprising:
            i) an anode catalyst layer;
            ii) a current collector;
            iii) an electrolyte in fluid communication with anode catalyst layer;
        c) a cathode configured on a cathode side of the carbon dioxide electrolysis cell and comprising:
            i) a cathode catalyst layer;
            ii) a cathode gas in fluid communication with the cathode catalyst layer;
            iii) an inlet coupled with the cathode enclosure;
            iv) an outlet;
    an oxygen depletion electrolysis cell comprising:
        a) an anion conducting membrane;
        b) an anode configured on an anode side of the oxygen depletion electrolysis cell and comprising:
            i) an anode catalyst layer;
            ii) a current collector;
            iii) an electrolyte in fluid communication with anode catalyst layer;
        c) a cathode configured on a cathode side of the oxygen depletion electrolysis cell and comprising:
            i) a cathode catalyst layer;
            ii) a cathode gas in fluid communication with the cathode catalyst layer:
            iii) an inlet coupled with the outlet of the carbon dioxide removal electrolysis cell;
            iv) an outlet coupled with the cathode enclosure;
            wherein the cathode enclosure gas is fed to the inlet of the cathode of the carbon dioxide removal cell as an inlet gas and is reacted on the cathode of the carbon dioxide removal cell to produce a reduced carbon dioxide gas having a reduced carbon dioxide concentration from a carbon dioxide concentration of said inlet gas;
            wherein the reduced carbon dioxide gas passes from the outlet of the cathode of the carbon dioxide removal cell to the inlet of the cathode of the oxygen depletion cell; and
            wherein the reduced carbon dioxide gas reacts on the cathode of the oxygen depletion electrolysis cell to produce an outlet gas having a reduced oxygen concentration from an oxygen concentration of the reduced carbon dioxide gas;
            wherein the outlet gas passes from the outlet of the oxygen depletion electrolysis cell to the cathode enclosure; and
            wherein the environmental control system effectively reduces both carbon dioxide and oxygen levels in the cathode enclosure.

2. The environment control system of claim 1, wherein the anion conducting membrane is a composite anion conducting membrane comprising:
    a support material; and
    an anion conducting polymer coupled with the support material attached to the anion conducting polymer.

3. The environment control system of claim 1, wherein the oxygen depletion electrolysis cell reacts with oxygen on the cathode side of the oxygen depletion electrolysis cell to reduce an oxygen concentration in the cathode enclosure.

4. The environment control system of claim 1, wherein carbon dioxide is reacted on the cathode side of the carbon dioxide removal electrolysis cell to form HCO3- that is transferred through the anion conducting membrane of the carbon dioxide removal electrolysis cell as $HCO_3-$, and then reformed via reaction on the anode catalyst layer of the carbon dioxide removal electrolysis cell to form carbon dioxide on the anode side.

5. The environment control system of claim 4, wherein the carbon dioxide on the anode side of the carbon dioxide removal electrolysis cell is vented from the electrolysis cell.

6. The environment control system of claim 1, wherein the electrolyte solution of at least one of the carbon dioxide removal electrolysis cell or the oxygen depletion electrolysis cell comprises hydroxide.

7. The environment control system of claim 1, wherein the electrolyte solution of at least one of the carbon dioxide removal electrolysis cell or the oxygen depletion electrolysis cell comprises a carbonate.

8. The environment control system of claim 1, further comprising an electrolyte solution reservoir wherein the electrolyte of the carbon dioxide removal electrolysis cell flows from electrolyte solution reservoir to the anode and back to the electrolyte solution reservoir to form an electrolyte loop.

9. The environment control system of claim 8, wherein the electrolyte loop comprises a pump to pump the electrolyte solution through the electrolyte loop.

10. The environment control system of claim 9, further comprising a water make-up system to supply water to the electrolyte loop and wherein the water make-up system comprises a water reclamation device coupled with the cathode to produced reclaimed water that is supplied to the water make-up system and the electrolyte loop.

11. The environment control system of claim 10, wherein the water reclamation device comprises a condenser that condenses the water from the cathode.

12. The environment control system of claim 1, wherein an air moving device increases a flow of oxygen to the cathode catalyst layer of the carbon dioxide removal electrolysis cell.

13. The environment control system of claim 1, further comprising an electrolysis cell heater that heats at least a portion of the carbon dioxide removal electrolysis cell.

14. The environment control system of claim 13, wherein the electrolysis cell heater heats the anode side of the carbon dioxide removal electrolysis cell to improve kinetics of reaction of the anode catalyst layer of the carbon dioxide removal electrolysis.

15. The environment control system of claim 1, further comprising an electrolyte solution heater that heats the electrolyte solution of the carbon dioxide removal electrolysis cell.

16. The environment control system of claim 1, further comprising a scrubber that removes carbon dioxide from the cathode enclosure gas before entry into the cathode of the carbon dioxide removal electrolysis cell.

17. The environmental control system of claim 1, wherein the carbon dioxide from the anode of the carbon dioxide removal cell is fed to the cathode enclosure, effectively maintaining a carbon dioxide level in the cathode enclosure while reducing an oxygen level within the cathode enclosure.

18. A method of producing an inert gas flow comprising:
providing an environmental control system comprising:
a cathode enclosure containing a cathode enclosure gas;
a carbon dioxide removal electrolysis cell comprising:
  a) an anion conducting membrane;
  b) an anode configured on an anode side of the electrolysis cell and comprising:
    i) an anode catalyst layer;
    ii) a current collector;
    iii) an electrolyte in fluid communication with anode catalyst layer;
  c) a cathode configured on a cathode side of the electrolysis cell and comprising:
    i) a cathode catalyst layer;
    ii) a cathode gas in fluid communication with the cathode catalyst layer;
    iii) an inlet coupled with the cathode enclosure;
    iv) an outlet;
an oxygen depletion electrolysis cell comprising:
  a) an anion conducting membrane;
  b) an anode configured on an anode side of the electrolysis cell and comprising:
    i) an anode catalyst layer;
    ii) a current collector;
    iii) an electrolyte in fluid communication with anode catalyst layer;
  c) a cathode configured on a cathode side of the electrolysis cell and comprising:
    i) a cathode catalyst layer;
    ii) a cathode gas in fluid communication with the cathode catalyst layer:
    iii) an inlet coupled with the outlet of the carbon dioxide removal electrolysis cell;
    iv) an outlet coupled with the cathode enclosure;
flowing the cathode enclosure gas to the inlet of the cathode of the carbon dioxide removal cell as an inlet gas wherein the inlet gas is reacted on the cathode of the carbon dioxide removal cell to produce a reduced carbon dioxide gas having a reduced carbon dioxide concentration from a carbon dioxide concentration of said inlet gas;
flowing the reduced carbon dioxide gas from the outlet of the cathode of the carbon dioxide removal cell to the inlet of the cathode of the oxygen depletion cell, wherein the reduced carbon dioxide gas reacts on the cathode of the oxygen depletion electrolysis cell to produce an outlet gas having a reduced oxygen concentration from an oxygen concentration of the reduced carbon dioxide gas.

19. The method of claim 18, further comprising flowing the outlet gas from the oxygen depletion electrolysis cell into the cathode enclosure, wherein the environmental control system effectively reduces both carbon dioxide and oxygen levels in the cathode enclosure.

20. The method of claim 19, wherein the carbon dioxide from the anode of the carbon dioxide removal cell is fed to the cathode enclosure, thereby effectively maintaining a carbon dioxide level in the cathode enclosure while reducing an oxygen level within the cathode enclosure.

* * * * *